United States Patent Office 3,816,402
Patented June 11, 1974

3,816,402
FIBERS OF CELLULOSE ESTER HAVING RANDOMLY DISTRIBUTED DICARBOXYLATE HALF-ESTER, HALF-t-AMINE DYE SITES
William K. Wilkinson, Waynesboro, Va., assignor to E. I. du Pont de Nemours & Company, Wilmington, Del.
No Drawing. Filed May 8, 1972, Ser. No. 251,119
Int. Cl. C08b *3/06, 3/16*
U.S. Cl. 260—225                      11 Claims

ABSTRACT OF THE DISCLOSURE

Cellulose ester fibers and films having excellent receptivity for basic dyes are produced by preparing a conventional spinning dope of cellulose acetate and volatile solvent, then mixing phthalic anhydride or other cyclic anhydride and trimethylamine or other tertiary amine with the spinning dope to react with the cellulose acetate, and dry spinning or casting the resulting dope directly into fibers or films. The modified cellulose acetate products have dicarboxylate substituents in the form of a half-ester, half-salt with the tertiary amine, and dye uniformly to bright washfast colors with basic dyes.

BACKGROUND OF THE INVENTION

This invention relates to improving the dye receptivity of cellulose acetate fibers and films. More particularly, it is concerned with a simple and rapid process for chemical modification of cellulose acetate and formation of fibers and films therefrom; and to the modified cellulose ester product, which is dyeable with basic dyes.

Cellulose acetate fibers and films are conventionally dry spun or cast from a viscous dope of acetylated cellulose in a suitable volatile solvent. Usually cellulose acetate having 50% to 57% by weight of combined acetic acid is spun from acetone solvent. Cellulose acetate having 59% to 61% combined acetic acid ("cellulose triacetate") can be spun from a mixture of methyl acetate and acetone. The products have been dyed with disperse dyestuffs. Conventional cellulose acetate fibers have little or no receptivity for basic dyes (also called cationic dyes). Basic dyes are of particular interest because of their special brilliance and great intensity. Although the desirability of achieving dyeability with basic dyes has been recognized for a long time, previous attempts have not been commercially successful.

SUMMARY OF THE INVENTION

The present invention provides a process for treating cellulose acetate in a spinning dope thereof to modify it chemically in a rapid manner, and then extruding the spinning dope to form fibers or films which dye readily with basic dyes to bright colors that are wash-fast. Good dye leveling and good dye bath exhaust of the chemically modified cellulose acetate fibers are achieved during dyeing, and dye retention throughout repeated launderings is excellent. When used with nylon, the fibers can be selectively dyed with a basic dye and the nylon can be selectively dyed with an acid dye to provide desirable cross-dyeing effects. The physical properties of the fibers produced are substantially unaffected by addition of the treatment to conventional procedure.

The process of this invention is an improvement in the conventional process of dry spinning or casting cellulose acetate fibers and films. The improvement comprises adding to the conventional cellulose acetate dope a cyclic anhydride of a dicarboxylic acid and a tertiary amine having a basicity value of less than 6.0 $pK_b$, mixing the dope until the anhydride has reacted at hydroxyl groups of the cellulose to form substituents which are dicarboxylate half-esters, half-salts of the tertiary amine. The resulting dope of dicarboxylate-substituted cellulose acetate is preferably dry spun or cast directly into fibers or films.

For preparation of films, the amount of cyclic anhydride added should be from about 1 to about 50 mol percent, based on the mols of repeating anhydroglucose units of the cellulose acetate present in the dope. For preparation of textile fibers, the amount of cyclic anhydride added should be from about 1 to about 15 mol percent. Phthalic anhydride, succinic anhydride and maleic anhydride are most useful, but any cyclic anhydride of a dicarboxylic acid is suitable provided that the dicarboxylic acid is free from other groups which would react with tertiary amines in the dope. The amount of tertiary amine added is from 0.5 to 2.0 equivalents per mol of cyclic anhydride used. Triethylamine and tetramethylethylenediamine are preferred but good results are obtained with any tertiary amine which has a basicity value of less than 6.0 $pK_b$. Preferably, the amount of cyclic anhydride added is about 3 to 10 mol percent based on the repeating anhydroglucose unit of the cellulose acetate in the dope. Preferably, the tertiary amine is added in an amount which provides between 0.5 and 1.0 equivalents per mol of the cyclic anhydride used. The solvent of which the dope is comprised may be any solvent for cellulose acetate which is free of compounds having a hydroxyl group attached to saturated carbon, other than the cellulose acetate. Acetone is the preferred solvent for secondary cellulose acetate.

The most novel and useful products of this invention are cellulose ester fibers wherein the cellulose ester consists essentially of a cellulose acetate having randomly distributed additional ester substituents represented by the formula —OOC—Q—COO⁻AH⁺, wherein Q is a divalent hydrocarbyl radical of 2 to 10 carbon atoms and A is a tertiary amine having a basicity value of less than 6.0 $pK_b$. Preferably the tertiary amine has 6 to 12 carbon atoms. The cellulose ester preferably contains at least 2.1 acetate groups per repeating anhydroglucose unit in the fiber product, corresponding to at least 50% by weight of combined acetic acid in the starting material.

Conventional cellulose acetate fibers usually contain about 55% combined acetic acid, and this amount is quite suitable for the present invention. The additional ester substituents are randomly distributed in the molecules comprising the fiber and are present in relatively small amounts ranging from 1 to 15 mol percent, and preferably about 3 to 10 mol percent, based on the mols of anhydroglucose units in the cellulose. Preferably the cellulose ester is a cellulose acetate-phthalate wherein the phthalate ester substituents are half-salts of trialkylamines of 6 to 12 carbon atoms.

DESCRIPTION OF THE INVENTION

A full understanding of the structure and preparation of the basically dyeable cellulose acetate fiber of the invention will be facilitated by a brief description of conventional cellulose acetate fibers. The raw material for preparing these fibers is cellulose, a naturally occurring molecule comprised of a chain of repeating anhydroglucose units, each containing three hydroxyl groups. In the cellulose chain, the anhydroglucose units are disposed alternately in opposite directions:

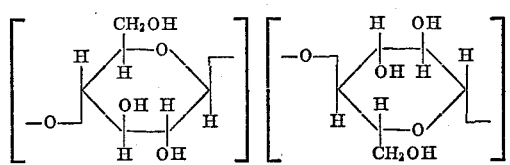

Each of the hydroxyl groups in the anhydroglucose repeating unit can be acetylated. Acetylated celluloses in which an average of from 2.1 to 3.0 of the hydroxyl groups per anhydroglucose unit are acetylated, corresponding to 50 to 62.5% combined acetic acid, have been used for fiber preparation. For film preparation the combined acetic acid content may usefully be as low as 45%, corresponding to 1.8 acetylated hydroxyls. Secondary cellulose acetate, which is soluble in acetone, usually contains about 55% combined acetic acid, and most of the commercial cellulose acetate fibers approximate this composition. The secondary cellulose acetate is usually prepared by acetylating the cellulose all the way to the triacetate and partially hydrolyzing the triacetate back to the desired level of combined acetic acid. Although more difficult to spin because of lower solubility, fibers can also be prepared from cellulose acetate containing about 60% combined acetic acid. These are nominally designated as triacetate fibers. Secondary cellulose acetate fibers thus contain approximately 0.5 hydroxyl group per anhydroglucose unit in the molecular chain; and although the triacetate fibers can be fully acetylated, they normally contain approximately 0.1 hydroxyl group per anhydroglucose unit to facilitate solubility in the dry spinning step.

The product of the present invention is a fiber of a cellulose acetate containing a dicarboxylate residue in the form of a salt of a tertiary amine. More specifically, the product is a fiber of a cellulose acetate containing at least 2.1 acetate groups per anhydroglucose repeating unit, in which from 0.01 to 0.1 of the remaining hydroxyl groups per anhydroglucose unit are reacted to form a dicarboxylate half-ester, half-salt of a tertiary amine. The product accordingly may be described as a fiber of a cellulosic polymer comprised of alternately disposed repeating units represented by the following formula:

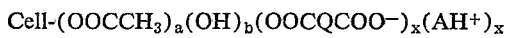

wherein "Cell" represents an anhydroglucose unit of the cellulose chain with its three hydroxyl groups removed; Q is an alkylene or arylene radical; A is a tertiary amine having a basicity, $pK_b$, of less than 6.0; $a$ is a number in the range of 2.1 to 2.95; $x$ is a number in the range of 0.01 to 0.15, and $b=3-a-x$.

It will be readily understood that the above representation is an average formula, taken over the entire amount of a sample of the polymer in the fiber form, and that individual anhydroglucose units each contain a total of three radicals selected from the group consisting of hydroxyl radicals, acetate radicals, and dicarboxylate radicals of the structure shown, said dicarboxylate radicals being randomly distributed among the anhydroglucose units comprising the polymer molecules of the fiber.

The process of this invention is carried out by dissolving in a cellulose acetate spin dope a cyclic anhydride, $Q(CO)_2O$, together with a tertiary amine of high basic strength. The spin dope is normally a conventional secondary cellulose acetate solution in acetone. However, a spin dope of cellulose triacetate containing a sufficient number of free hydroxyl groups to react with the cyclic anhydride may be employed. To enhance solubility, a small amount of water is usually added to the acetone. In place of acetone, another suitable solvent free of compounds having a hydroxyl group attached to saturated carbon may be employed. A mixture of methyl acetate and acetone is a suitable solvent for the triacetate. Dimethylformamide, dimethylsulfoxide, nitromethane, and methyl Cellosolve acetate are other solvents which may be employed.

The cyclic anhydride may be an anhydride of any suitable dicarboxylic acid which forms a cyclic anhydride. In the formula $Q(CO_2)O$ for such an anhydride, the radical Q is usually a divalent hydrocarbyl radical; however, it may contain substituents which are inert in the spin dope in the presence of an amine, such as a chlorine, bromine, or ether substituent. Preferred cyclic anhydrides include phthalic anhydride, succinic anhydride, and maleic anhydride. Other suitable cyclic anhydrides include hexahydrophthalic anhydride, tetrachlorophthalic anhydride, tetrabromophthalic anhydride, naphthalene-1,2-dicarboxylic anhydride, and dibromo-succinic anhydride. The process is readily carried out at any level in the range of 1 mol percent or even lower up to about 50 mol percent of added cyclic anhydride, based on the repeating anhydroglucose unit of the cellulose acetate in the spin dope. The product obtained throughout this range is suitable for the preparation of useful films and for coating applications and the like. Esterification of more than about 15 mol percent of the cyclic anhydride is avoided in the preparation of textile fibers, since fiber properties are adversely affected above this level. The optimum amount of cyclic anhydride which is added is about 3 to 10 mol percent in the preparation of textile fibers.

The amine which is added to the cellulose acetate spin dope with the cyclic anhydride may be any tertiary amine having a high basic strength. By "high basic strength," it is meant that the basicity, $pK_b$, of the amine is less than 6.0. Primary amines and secondary amines are much less effective, even if they have a high basic strength. A trialkylamine of 3 to about 20 carbon atoms is usually employed, but the tertiary amine may contain a cyclic group and may contain ether groups, aromatic hydroxyl groups, or other groups which do not interfere with the reaction of the amine with the cyclic anhydride in the cellulose acetate in the spin dope. Triethylamine is a preferred amine. Other suitable amines include trimethylamine, tripropylamine, tributylamine, triamylamine, cyclohexyldimethylamine, N-methylpiperidine, N-methylmorpholine, N,N-dimethyldodecylamine, tris-(dimethylaminomethyl)phenol, and N,N' - diisopropyl-N-benzylamine. The amount of amine which is added should be in the range of from 0.5 to 2.0 equivalents per mol of the cyclic anhydride. In the case of tertiary amines containing only one nitrogen atom, the amount of the amine employed is thus from 0.5 to 2.0 mols per mol of the anhydride. Compounds containing more than one tertiary amine group may also be employed, calculating an equivalent of a compound containing $n$ tertiary amine groups as $1/n$ mol of the compound. Thus, N,N,N',N'-tetramethylethylenediamine may suitably be used in the amount of 0.25 to 1.0 mol of the anhydride.

The reaction of phthalic anhydride with cellulose acetate in the presence of the tertiary amines of the invention takes place spontaneously. At room temperature in the presence of triethylamine the reaction is about 80% complete in five minutes, about 90% complete in 20 minutes, and substantially 100% complete within four hours. The reaction proceeds more rapidly at higher temperatures. In accordance with the present invention, the reaction is preferably carried out by mixing the reagents at a temperature of about 25 to 40° C. for a period of about 1 to 8 hours, after which the reaction mixture may be permitted to cool and stand as long as it is desired until the spinning can be carried out. Maleic anhydride reacts much more rapidly than phthalic anhydride; even at room temperature maleic anhydride undergoes complete reaction with cellulose acetate in the presence of the amine within five minutes. The reaction time is thus dependent upon the specific anhydride used. It is also dependent upon the specific amine used.

The amount of dicarboxylate bound to the cellulose acetate as the half-ester depends upon which reagent is used in inferior amount. It is preferred that less than 1.0 equivalent of the tertiary amine per mol of the cyclic anhydride be used, so that excess amine will not be present when the spin dope is extruded; and in this situation the amount of amine added is the controlling factor in the amount of dicarboxylate which is bound to the cellulose acetate in the product. On the other hand, if more than 1.0 equivalent of the tertiary amine per mol of the cyclic anhydride is used, the amount of anhydride added is the controlling factor. Of course, if the reaction time is too short prior to extrusion, the reaction may not proceed to completion, whichever reagent is the controlling one. Amounts greater than 2 equivalents of the tertiary amine per mol of the anhydride to not enhance the reaction rate and are regarded as unnecessary and undesirable.

The spinning of the cellulose acetate dope so prepared is carried out in accordance with the conventional dry spinning process well known in the prior art, and the fibers so produced are processed and packaged in the conventional manner. However, the resulting cellulose acetate fibers are found to have the property of excellent dyeability with basic dyes, coupled with high washfastness of the dyed products. Moreover, the fibers exhibit good leveling during dyeing to brilliant colors at good dye bath exhaust, using these basic dyes. The fibers possess good physical properties, comparable to conventional cellulose acetate fibers. A unique advantage of the basically dyeable cellulose acetate fibers of the invention is their ability to be cross dyed in blends with fibers having sites for acid dyes, such as nylon.

The cellulose acetate fibers of the invention may also be dyed very acceptably with disperse dyes, their dyeability performance with these dyes being comparable to that of the conventional cellulose acetate fibers.

The cellulose acetate product of this invention may also be extruded in the conventional manner to form cellulose acetate films which exhibit excellent receptivity to basic dyes; or it may be used for coating application or formed in other suitable ways to make various shaped products.

The following examples will serve to illustrate the invention. In the examples, except where otherwise stated, the spin dope employed contains cellulose acetate having 55.2% combined acetic acid, corresponding to 2.43 of the three hydroxyl radicals in each anhydroglucose unit being acetylated. The spin dope has a solution viscosity of 550 poises, a solids concentration of 26%, and contains 1.5% water.

EXAMPLE I

Fibers prepared from cellulose acetate treated with phthalic anhydride and triethylamine To a cellulose acetate spin dope is added 4 weight percent of phthalic anhydride and 2.4 weight percent triethylamine, the percentages of phthalic anhydride and triethylamine being based on the weight of the cellulose acetate. This corresponds to 7.1 mol percent phthalic anhydride and 6.3 mol percent triethylamine, based on the anhydroglucose repeating unit of the cellulose acetate. The mixture is stirred slowly, and the additives are dissolved in less than 10 minutes. The solution is heated at 60° C. for 2 hours, and is then cooled to room temperature.

After remaining 16 to 20 hours at room temperature, the solution is heated to 68° C. and is spun through a spinneret containing 40 orifices into a 150 denier yarn, the temperature of the spinning cell being 117° C. and the speed of the windup being 650 y.p.m. The spun yarn has a shrinkage in steam of 2.5% and is equivalent in luster and whiteness to a similar yarn, spun from a dope to which no phthalic anhydride or triethylamine has been added. The fiber is analyzed for bound phthalate content by determining its aromatic content. In this determination, the fiber sample is dissolved in acetone, and a film is cast from the acetone solution. The film is scanned in infrared at 3.4 micron to measure film thickness by the C—H absorption, then in ultraviolet at 272 millimicrons to measure aromatic content. Comparison of the ultraviolet and infrared absorptions gives aromatic content at unit film thickness. From a standard curve, it is calculated that the fiber contains 6.3 mol percent of phthalate/triethylamine salt dye site affixed to the cellulose acetate.

In the structural formula for the product, this corresponds to values of $x=0.063$, $a=2.43$, and $b=0.507$.

The fibers so produced is dyed with 1% of the dye having the Color Index (abbreviated hereinafter as "C.I.") identification of Basic Red 15. In this procedure, the fiber is placed in 100 times its weight of water, 1% of its weight of sodium acetate to adjust to pH 7-8, and 1% of its weight of the dye. The temperature of the bath is raised from 60° C. to 90° C. at 2° per minute. The fibers are dyed rapidly (95% exhaustion of dye onto fiber in less than 30 minutes) to a deep, even shade of red.

In a similar experiment, the procedure is repeated, except that 6 weight percent of the phthalic anhydride and 3.6 weight percent of the triethylamine are substituted for the weights indicated in the first paragraph of this example. The mol percentages, based on cellulose acetate, are correspondingly 10.7 mol percent for the phthalic anhydride and 9.4 mol percent for the triethylamine. The modified spin dope is readily dry spun to form fibers of good luster and whiteness, which dye readily following the above procedure to an even deeper shade of red. The fiber contains 8.6 mol percent of phthalate/triethylamine salt dye site affixed to the cellulose acetate, determined as described above. In the structural formula for the product, this corresponds to values of $x=0.086$, $a=2.43$, and $b=0.484$.

EXAMPLE II

Film prepared from cellulose acetate treated with phthalic anhydride and triethylamine To 10.3 g. of a cellulose acetate spin dope is added 1.5 g. (15 weight percent) of phthalic anhydride and 0.8 g. (8 weight percent) triethylamine. This corresponds to 27 mol percent phthalic anhydride and 21 mol percent triethylamine, based on the anhydroglucose repeating unit of the cellulose acetate. The mixture is stirred slowly, and the additives are dissolved rapidly.

A film is prepared from the modified spin dope so produced by spreading the solution onto a glass plate with a "doctor" knife 0.010-inch thick. The plate is heated at 60° C. for 15 minutes to evaporate the acetone. The film so produced is dyed with an excess of C.I. 51004 Dye at a pH of 9 for one minute at the boil. The film is dyed rapidly to a deep, even shade of blue. A control film of unmodified cellulose acetate is scarcely dyed at all.

EXAMPLE III

Fibers prepared from cellulose acetate treated with phthalic anhydride and trimethylamine or triethylamine Cellulose acetate spin dope is diluted with acetone to form a 13.5% solution of cellulose secondary acetate in acetone. The solution initially contains 0.75% water from the spin dope. In a series of runs from which the results are summarized in Table I, 100 ml. of the dilute solution of cellulose acetate is employed in each instance, and the indicated amounts of phthalic anhydride and tertiary amine are added. The weight percent and mol percent values of these additives, based on cellulose acetate, are also given. The tertiary amine employed is triethylamine in the first two runs and aqueous trimethylamine in the last three runs. The total amount of water in the solution in each instance is calculated, and this value is recorded in the table. The solutions are allowed to stand overnight, after which films are cast. The films are extracted by immersing them in water at 60-80° C. for one hour to remove unbound phthalic acid. The films are then analyzed for bound phthalate content as in Example I, and these results are reported in the table.

TABLE I.—REACTION OF CELLULOSE ACETATE WITH PHTHALIC ANHYDRIDE AND TERTIARY AMINE IN PRESENCE OF VARYING AMOUNTS OF WATER

| Run number | Anhydrous triethylamine | | 22% solution of trimethylamine in water | | |
|---|---|---|---|---|---|
| | 1 | 2 | 3 | 4 | 5 |
| Weight phthalic anhydride, g | .52 | .78 | .52 | .78 | .52 |
| Weight percent phthalic anhydride | 3.9 | 5.8 | 3.9 | 5.8 | 3.9 |
| Mol percent phthalic anhydride | 6.9 | 10.3 | 6.9 | 10.3 | 6.9 |
| Weight amine ingredient, g. (including any water) | .35 | .53 | .91 | 1.41 | .91 |
| Weight percent amine | 2.6 | 3.9 | 1.55 | 2.30 | 1.55 |
| Mol percent amine | 6.8 | 10.3 | 6.8 | 10.3 | 6.8 |
| Weight percent additional water | | | | | 1.0 |
| Total water, mol percent on phthalic anhydride | 1,200 | 790 | 1,750 | 2,200 | 3,900 |
| Bound phthalate dye sites, mol percent on cellulose acetate | 5.6 | 8.7 | 7.0 | 9.7 | 6.7 |

Films are made from a solution having the proportions designated as Run No. 3 in Table I. The film so produced is dyed with an excess of the dye having the C.I. identification of Basic Blue 22. The films are dyed rapidly to a deep, even shade of blue.

The above example illustrates that the process of the present invention can be carried out rapidly and effectively even when a considerable amount of water is present in the reaction mixture.

EXAMPLE IV

Films prepared from cellulose acetate reacted with triethylamine and various anhydrides In a series of five experiments, 8 weight percent (21 mol percent) of triethylamine is added to a cellulose acetate spin dope, together with a different reagent in each of the five experiments as follows:

Experiment 1—Control—No additional reagent
Experiment 2—12 weight percent (32 mol percent) succinic anhydride
Experiment 3—12 weight percent (32 mol percent) maleic anhydride
Experiment 4—12 weight percent (21 mol percent) phthalic anhydride
Experiment 5—12 weight percent (19 mol percent) phthalic acid A film is prepared from each of the above samples by casting the solution on a glass plate to give a final film thickness of 0.001 inch after evaporating the solvent at 60° C. for 30 minutes.

Each of the films is dyed with C.I. 51004 Dye, following the procedure described in Example II, except for dyeing five minutes at the boil. In Experiments 2, 3 and 4, in each of which cyclic anhydrides are added to the cellulose acetate spin dope, the films are dyed a deep shade of blue. In Experiment 1, the control experiment in which no additional additive is employed, the film adsorbs substantially none of the dye. In Experiment 5, in which phthalic acid was employed as a control, it is observed that the film also adsorbs no more dye than the control.

EXAMPLE V

Films prepared from cellulose acetate reacted with phthalic anhydride and various amines In a series of film preparations, cellulose acetate spin dope is reacted with phthalic anhydride and a series of amines to determine the effectiveness of the various amines. The results are reported in Table II. The first item is a control in which no additive is employed. For all of the other items, 100 g. of cellulose acetate spin dope is mixed with 0.6 g. (4 weight percent or 7.1 mol percent) of phthalic anhydride, along with the amount of the amine indicated in the table. In each of the preparations, the amount of amine is greater than the equimolar amount, based on the phthalic anhydride. After stirring the reagents for 15 minutes, the mixtures are allowed to stand for 10 hours. The haziness of the mixtures is reported in the table. The modified spin dope is then cast at a thickness of 15 mils into a film and dried, the dry film being about 2 mils thick. Each of the films is then dyed with an excess of C.I. 51004 Dye at a pH of 6 for 15 minutes at 80–90° C. The amount of dye on each film is then measured, using a spectrophotometer. The film derived by employing triethylamine is dyed a deep blue and is designated as the standard (at a rating of 100%) against which the other films are compared. The results are indicated in the table below. In this table, only items 2, 3 and 4 are illustrative of the practice of the present invention, the remaining items being comparative items employing other amines.

TABLE II.—DYEABILITY OF FILMS OF CELLULOSE ACETATE TREATED WITH PHTHALIC ANHYDRIDE AND VARIOUS AMINES

| Item No. | Amine | Amt. of amine, ml. | Haziness of solution | Relative dye on film | pK$_b$ of amine |
|---|---|---|---|---|---|
| 1 | None (control) | | Clear | 5 | |
| 2 | Triethylamine | 0.6 | do | 100 | 3.3 |
| 3 | Tetradecydimethylamine | 1.2 | do | 100 | <6.0 |
| 4 | Tri-n-butylamine | 1.2 | do | 60 | 3.6 |
| 5 | Di-n-butylamine | 0.8 | do | 20 | 3.4 |
| 6 | n-Butylamine | 0.6 | Pale yellow | 30 | 3.4 |
| 7 | Aniline | 0.8 | Yellow | 5 | 9.4 |
| 8 | Dimethylaniline | 0.8 | do | 12 | 8.8 |
| 9 | Ammonium hydroxide | 0.5 | Milky | 15 | 4.8 |

EXAMPLE VI

Film prepared from cellulose acetate reacted with phthalic anhydride and tetramethylethylenediamine To a cellulose acetate solution containing 20 g. of solids and 150 ml. of acetone is added 0.31 g. of tetramethylethylenediamine (1.55 weight percent) and 0.8 g. (4 weight percent) of phthalic anhydride. This corresponds to 3.7 mol percent of the diamine and 7.1 mole percent of the anhydride, based on the anhydroglucose repeating unit of the cellulose acetate; and the mixture therefore contains essentially 1.0 equivalent of the diamine per mol of the anhydride. The mixture is shaken for one hour at room temperature. A film is then cast upon glass and dried at 60° C. for 15 minutes. The film is extracted at a pH of 7 at 70–85° C. for 15 minutes and then analyzed for bound phthalate content, determining film thickness by infrared analysis and phenylene content by U.V. analysis. The film is found to contain 3.4 weight percent of phthalate dye site (5.6 mol percent). The film so produced is dyed with an excess of the dye having the C.I. identification of Basic Red 15 at 70–85° C. for 15 minutes. The film is dyed rapidly to a deep, even shade of red.

EXAMPLE VII

Films prepared by reacting phthalic anhydride and trimethylamine with cellulose acetate samples having varying levels of combined acetic acid In a series of experiments, 4 weight percent of phthalic anhydride and 7.2 weight percent of a 22% solution in water of trimethylamine (1.6 weight percent) are added to solutions of cellulose acetate having contents of combined acetic acid at the 52%, 55%, and 57% levels. In a fourth experiment, a solution of cellulose triacetate having a content of 60.8% combined acetic acid in dimethylformamide is treated with a 4 weight percent phthalic anhydride and 7.2 weight percent of the aqueous trimethylamine at 80° C. for one-half hour.

Films cast from the reaction products from these experiments are dyed for one-half hour at 90° C. and a pH of 7 with excess dye having the C.I. identification of Basic Red 15. In this series of samples, the dye rate decreases as the combined acetic acid content increases. However, even the triacetate film dyes much more deeply at 90° C. then a control sample of unmodified cellulose triacetate film dyed with the same dye under the same conditions.

Blends of the basically dyeable cellulose acetate fiber of the present invention with acid-dyeable fibers such as wool, silk, nylon, and commercially available acid dyeable acrylic fibers can be dyed in the same dye bath to washfast colors in the same shade or to different washfast colors by proper selection of basic and acid dyestuffs. This possibility cannot be realized with conventional secondary cellulose acetate fibers employing the customary disperse dyestuffs since the dyestuffs are not selective between the cellulose acetate fibers and the other fibers in the blend, and the dyed fibers in the resulting blend are not all washfast. The styling possibilities which can be realized employing the basically dyeable cellulose acetate fibers of the present invention are illustrated by the following example.

EXAMPLE VIII

Fiber blend of basically dyeable cellulose acetate with nylon fibers

A knit structure containing nylon and the fiber of Example I above is dyed in a one-step procedure as follows: A dye bath of 100 times the fabric weight is made up and adjusted to a pH of 4 with acetic acid. A red acid dye having the C.I. identification Acid Red 37 is added at 2% on fiber weight. The bath is heated to 50° C. and the fabric is added, after which the temperature of the bath is raised at 2° per minute to 80° C., at which time the dye is exhausted. The acidity of the dye bath is adjusted to a pH of 6 with sodium acetate, after which the blue basic dye having the identification number C.I. 51004 is added at 2% on fiber weight. Within 15 minutes this dye also exhausts onto the fiber. Each of the dyestuffs selectively dyes onto the fiber which has affinity for it, the acid dye onto the nylon fiber and the basic dye onto the cellulose acetate fiber of the invention; and there is no staining of either of the fibers by the other dyestuff. The dyed knit structure product exhibits no appreciable color loss in the course of 10 launderings.

EXAMPLE IX

Fibers prepared from cellulose acetate of low acetate content in 80/20 acetone/water solvent Twenty grams of cellulose acetate having a combined acetic acid content of 47% is added with stirring to 160 g. of acetone and 40 g. of water. The polymer dissolves at 25° C. To this is added 0.8 g. of phthalic anhydride, corresponding to 4 weight percent (based on cellulose acetate) or 6.6 mol percent. The phthalic anhydride dissolves in about 5 minutes, after which 0.54 g. of triethylamine, corresponding to one equivalent based on the phthalic anhydride, is added to the mixture. The mixture is stirred briefly, and then stored for 16 hours. A film is then cast and permitted to evaporate at 60° C. The resulting film is lustrous.

For the purpose of comparison, a control film is prepared as described above from a solution of the same cellulose acetate starting material in acetone/water solution of the same concentration, but without the addition of phthalic anhydride or triethylamine. The control film is observed to be chalky and opaque.

Films dyed for 15 minutes at 80° C. with excess C.I. Basic Red 15 Dye are prepared. It is observed that the film prepared from the cellulose acetate reacted with the phthalic anhydride and triethylamine is deeply dyed, as contrasted with the control film to which none of the phthalic anhydride or triethylamine is added.

A sample of the film prepared by adding the phthalic anhydride and triethylamine is extracted at 60° C. for ½ hour at a pH of 7.5 to remove any occluded phthalic acid. The film is then analyzed for aromatic content, determining film thickness by infrared analysis and phenylene content by U.V. analysis as described in Example I. The film is found to contain about 4 weight percent of the —OC—$C_6H_4$—COO— group. This corresponds to about 6.9 mol percent, based on the anhydroglucose repeating unit.

EXAMPLE X

Fibers prepared from cellulose acetate treated with phthalic anhydride and triethylamine To a cellulose acetate spin dope comprising cellulose acetate of 55% combined acetic acid (equivalent to 39 weight percent acetyl content) dissolved in acetone having a solids content of 27% and containing 1.5% water is added 6 weight percent of phthalic anhydride and 3.6 weight percent triethylamine, based on solids. This corresponds to 10.7 mol percent phthalic anhydride and 9.4 mol percent triethylamine, based on the anhydroglucose repeating unit of the cellulose acetate. The mixture is stirred slowly for 10 minutes after which it is heated at 60° C. for two hours with continued stirring. The mixure is then cooled to room temperature, left standing for one hour, and then spun into filaments. These filaments are designated below as the Test Fibers.

The aromatic content of the filaments is determined as described in Example 1. The filaments are found to contain 5.2 weight percent of the —OC—$C_6H_4$—COO— group. This corresponds to 8.5 mol percent of phthalate/triethylamine salt dye site affixed to the cellulose acetate. In the structural formula for the product, this corresponds to values of $x=0.085$, $a=2.43$, and $b=0.485$, wherein the phthalate/triethylamine salt dye sites are randomly distributed throughout all the cellulose ester molecules in the fibers.

When dyed with an excess of C.I. 51004 dye for two minutes at 80° C., the Test Fibers are dyed to a deep shade of blue containing 1.90 weight percent dye on fiber.

Control fibers spun from an untreated quantity of spin dope under the same spinning conditions, when dyed under the same conditions with C.I. 51004 dye, are dyed only to a very light shade of blue containing 0.13 weight percent dye on the fiber.

EXAMPLE XI

Fibers prepared from cellulose acetate treated with succinic anhydride and triethylamine To a cellulose acetate spin dope comprising cellulose acetate of 55% combined acetic acid dissolved in acetone having a solids content of 26% is added 3 weight percent of succinic anhydride and 3 weight percent of triethylamine, based on the weight of the cellulose acetate. This corresponds to 7.9 mol percent succinic anhydride and 7.8 mol percent triethylamine, based on anhydroglucose repeating unit of the cellulose acetate. The mixture is stirred slowly for 30 minutes at room temperature and left to stand 24 hours before spinning.

The mixture is spun into fiber as in Example I, and dyed as in Example I. The fibers are rapidly dyed to a deep even shade of red with good dye bath exhaustion. One half of the fiber is washed in a 0.2% detergent solution for 45 minutes at 49. C. simulating five home launderings. The dyed fiber is found to have excellent washfastness.

COMPARATIVE EXAMPLE

A quantity of cellulose acetate phthalate is prepared in accordance with the following procedure: 2 parts of cellulose acetate of 52.5% combined acetic acid (equivalent to 38 weight percent acetyl content) are treated with 10 parts of phthalic anhydride mixed with 0.7 ml. of pyridine per gram of phthalic anhydride and 5 ml. of benzene per gram of phthalic anhydride for 20 hours at 60–65° C. The cellulose acetate slowly goes into solution while being stirred periodically. At the end of the 20-hour reaction period, the mixture is cooled, and methanol is added to precipitate the polymer. The polymer is dried at 60° C., pulverized, and heated with 5% aqueous acetic acid (20 ml. per gram of phthalic anhydride starting material) at 60-80° C. for two hours. The product is dried at 120° C. and analyzed for the content of —OC—C₆H₄—COO— group by saponification, followed by ultraviolet analysis for sodium phthalate content at 272 millimicrons using pure sodium phthalate. The product contains 31 weight percent of the —OC—C₆H₄—COO— group.

The following solutions are prepared:

(a) A 25% solution in acetone of cellulose acetate phthalate containing 31 weight percent of the

—OC—C₆H₄—COO— group;

(b) A 25% solution in acetone of cellulose acetate of 38 weight percent acetyl content (no

—OC—C₆H₄—COO— groups).

One part of solution (a) is mixed with five parts of solution (b) and the blended solution is spun into filaments under the same conditions employed in spinning the filaments in Example X. The filaments prepared from the blended solution are designated below as the Blend Fibers. The Blend Fibers, when analyzed according to the procedure for aromatic content described in Example I, are found to have a content of 5.2 weight percent of the —OC—C₆H₄—COO— group. However, the phthalate ester radicals are not randomly distributed throughout all the cellulose ester molecules in the Blend Fibers, but are concentrated upon one-sixth of the cellulose ester molecules in the fibers.

When dyed with an excess of C.I. 51004 dye for two minutes at 80° C., a fabric of the Blend Fibers is dyed only to a medium shade of blue containing 1.40 weight percent dye on the fiber.

In another dyeing experiment, a single dyebath of excess C.I. 51004 dye at 80° C. for 2 minutes is employed for simultaneous dyeing of fabrics of three fiber samples. In this experiment, the Blend Fibers adsorb 0.96 weight percent dye on fiber, the Example X Test Fibers adsorb 1.20 weight percent dye on fiber, and the Example X Control Fibers adsorb 0.10 weight percent dye on fiber.

In yet another dyeing experiment, a single dyebath of excess C.I. 51004 dye at 80° C. for 100 minutes is employed for simultaneous dyeing of fabrics of three fiber samples to test maximum dye depth. In this experiment, the Example X Test Fibers adsorb 3.30 weight percent dye on fiber and reach a full deep shade of blue, while the Blend Fibers adsorb only 2.20 weight percent dye on fiber and distinctly lack the full depth of color development of the Example X Test Fibers. The Example X Control Fibers adsorb only 0.26 weight percent dye on fiber and are dyed only a light shade of blue.

In a test for washfastness, fabrics of the Example X Test Fibers and of the Blend Fibers are dyed to approximately the same medium shade of blue. However, a fabric of the Example X Control Fiber cannot be dyed to a medium shade of blue even with excess basic dye for prolonged times, so a fabric of this fiber which is dyed only to a light shade of blue is used in this test. The dyed fabrics are agitated in a 0.2% detergent solution for 45 minutes at 49° C., simulating five home launderings. In this test, the Example X Test Fibers retain almost all of the original dye, while the Blend Fibers lose almost all of the original dye. The washfastness results, together with the other dyeing results described above, are listed in Table III. Analytical measurements are given in Table IV.

TABLE IV.—ANALYTICAL MEASUREMENTS

| | —OC—C₆H₄—COO— | | |
|---|---|---|---|
| | Weight percent as made | Weight percent scoured 20 min. at 50° C. | Percent retained |
| Example X test fibers | 5.2 | 4.9 | 94 |
| Blend fibers | 5.2 | 2.7 | 52 |
| Example X control fibers | None | None | |

I claim:

1. In the process of producing fibers and films of cellulose acetate containing at least 45 weight percent of combine acetic acid by preparing a viscous dope of the cellulose acetate in a volatile solvent and dry spinning or casting the dope; the improvement for providing good dyeability with basic dyes which comprises adding to said dope 1 to 50 mol percent of a cyclic anhydride of a dicarboxylic acid, based on the moles of anhydroglucose units of the cellulose acetate present, and 0.5 to 2.0 equivalents per mole of anhydride of a tertiary amine having a basicity value of less than 6.0 pK_b, and mixing the dope until the anhydride has reacted at hydroxyl groups of the cellulose to form substituents which are dicarboxylate half-ester, half-salts of the tertiary amine.

2. A process as defined in claim 1 wherein the resulting dope of dicarboxylate-substituted cellulose acetate is dry spun into fibers.

3. A process as defined in claim 1 wherein said cyclic anhydride is phthalic anhydride.

4. A process as defined in claim 1 wherein said cyclic anhydride is succinic anhydride.

5. A process as defined in claim 1 wherein said cyclic anhydride is maleic anhydride.

6. A process as defined in claim 1 wherein said tertiary amine is a trialkyl amine of 3 to 20 carbon atoms.

7. A cellulose ester fiber wherein the cellulose ester consists essentially of a cellulose acetate containing at least 2.1 acetate groups per anhydroglucose repeating unit and having randomly distributed additional ester substituents represented by the formula

—OOC—Q—COO⁻AH⁺ wherein Q is a divalent hydrocarbyl radical of 2 to 10 carbon atoms and A is a tertiary amine having a basicity value of less than 6.0 pK_b, said additional substituents being present in amounts ranging from 1 to 15 mole percent based on the moles of anhydroglucose units in the cellulose.

8. A cellulose ester fiber as defined in claim 7 wherein said cellulose ester is a cellulose acetate-phthalate.

9. A fiber as defined in claim 7 wherein said cellulose ester is a cellulose acetate-succinate.

10. A fiber as defined in claim 7 wherein said cellulose ester is a cellulose acetate-maleate.

11. A fiber as defined in claim 7 wherein said cellulose ester is a cellulose acetate-phthalate containing about 55 percent by weight of combined acetic acid and the phthalate substituent is a half-salt of a trialkylamine of 6 to 12 carbon atoms.

(References on following page)

TABLE III.—DYEABILITY AND WASHFASTNESS COMPARISONS

| Sample | Dyeability tests, percent dye | | | Washfastness test, percent | | |
|---|---|---|---|---|---|---|
| | Individual baths | Same bath | Maximum dyeability | Dye on fiber at start | Dye on fiber after washing | Retained |
| Example X test fibers | 1.90 | 1.20 | 3.30 | 1.00 | 0.91 | 91 |
| Blend fibers | 1.40 | 0.96 | 2.20 | 0.75 | 0.16 | 21 |
| Example X control fibers | 0.13 | 0.10 | 0.26 | 0.26 | 0.20 | 77 |

References Cited

UNITED STATES PATENTS

| | | | |
|---|---|---|---|
| 1,969,741 | 8/1934 | Fordyce | 260—225 |
| 2,093,462 | 9/1937 | Malm et al. | 260—225 |
| 2,534,371 | 12/1950 | Richter | 260—225 |
| 2,011,345 | 8/1935 | Malm et al. | 260—225 |
| 2,024,238 | 12/1935 | Malm et al. | 260—225 |
| 2,093,464 | 9/1937 | Malm et al. | 260—225 |
| 2,759,925 | 8/1956 | Hiatt et al. | 260—225 |
| 3,538,079 | 11/1970 | Allen et al. | 260—215 |
| 3,619,105 | 11/1971 | Caldwell | 106—196 |

FOREIGN PATENTS

| | | | |
|---|---|---|---|
| 458,978 | 8/1949 | Canada | 260—225 |

DONALD E. CZAJA, Primary Examiner

R. W. GRIFFIN, Assistant Examiner

U.S. Cl. X.R.

106—196